US008887437B2

(12) United States Patent
Donoho

(10) Patent No.: US 8,887,437 B2
(45) Date of Patent: Nov. 18, 2014

(54) ELECTRIFIED BIRD DETERRENT DEVICE WITH TREADS

(75) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 464 days.

(21) Appl. No.: 13/365,571

(22) Filed: Feb. 3, 2012

(65) Prior Publication Data

US 2013/0081578 A1 Apr. 4, 2013

Related U.S. Application Data

(60) Provisional application No. 61/543,253, filed on Oct. 4, 2011.

(51) Int. Cl.
*A01M 19/00* (2006.01)
*A01M 29/26* (2011.01)

(52) U.S. Cl.
CPC ........................... *A01M 29/26* (2013.01)
USPC ............................................... 43/98; 340/573.2

(58) Field of Classification Search
USPC ................. 43/98, 112; 340/573.2; 256/10; 361/232; 119/537
See application file for complete search history.

(56) References Cited

U.S. PATENT DOCUMENTS

| | | | |
|---|---|---|---|
| 3,366,854 A | 1/1968 | Robinson | |
| 4,015,176 A | 3/1977 | Shanahan et al. | |
| 4,149,541 A | 4/1979 | Gammons et al. | |
| 5,007,196 A | 4/1991 | Saunders et al. | |
| 5,031,353 A | 7/1991 | Gardiner | |
| 5,850,808 A * | 12/1998 | Burdick | 119/713 |
| 6,006,698 A | 12/1999 | Negre | |
| 6,283,064 B1 | 9/2001 | Djukastein et al. | |
| 6,925,748 B2 | 8/2005 | McGill et al. | |
| 6,928,768 B1 | 8/2005 | Snow | |
| 6,933,446 B1 | 8/2005 | Waldorf et al. | |
| 7,351,913 B2 * | 4/2008 | Waldorf et al. | 174/117 F |
| 7,481,021 B2 | 1/2009 | Riddell | |
| 8,015,747 B2 | 9/2011 | Donoho | |
| 8,020,340 B2 | 9/2011 | Donoho | |
| 8,293,044 B1 * | 10/2012 | Riddell | 156/71 |
| 8,640,380 B2 * | 2/2014 | Turner | 43/98 |
| 2005/0132635 A1 * | 6/2005 | Riddell | 43/98 |
| 2007/0214710 A1 | 9/2007 | Donoho | |
| 2010/0180490 A1 | 7/2010 | Donoho | |
| 2011/0030621 A1 | 2/2011 | Donoho | |
| 2011/0067646 A1 | 3/2011 | Donoho | |
| 2011/0146589 A1 | 6/2011 | Donoho | |
| 2011/0214339 A1 * | 9/2011 | Donoho | 43/112 |
| 2012/0127624 A1 * | 5/2012 | Ritson | 361/232 |

FOREIGN PATENT DOCUMENTS

| | | |
|---|---|---|
| EP | 1314355 | 5/2003 |
| WO | 93/20689 A1 | 10/1993 |
| WO | 95/08915 A1 | 4/1995 |
| WO | 00/21363 | 4/2000 |

* cited by examiner

*Primary Examiner* — Christopher P Ellis
(74) *Attorney, Agent, or Firm* — Fish & Tsang LLP

(57) ABSTRACT

An animal deterrent device includes an elongated carrier having a conductive trace. The carrier can further include a bottom surface with a tread pattern having a pattern of grooves. The conductive trace can be coupled to the carrier by a fastener that extends from the conductive trace to the pattern of grooves, which can prevent water from contacting the fastener and shorting the conductive trace.

18 Claims, 4 Drawing Sheets

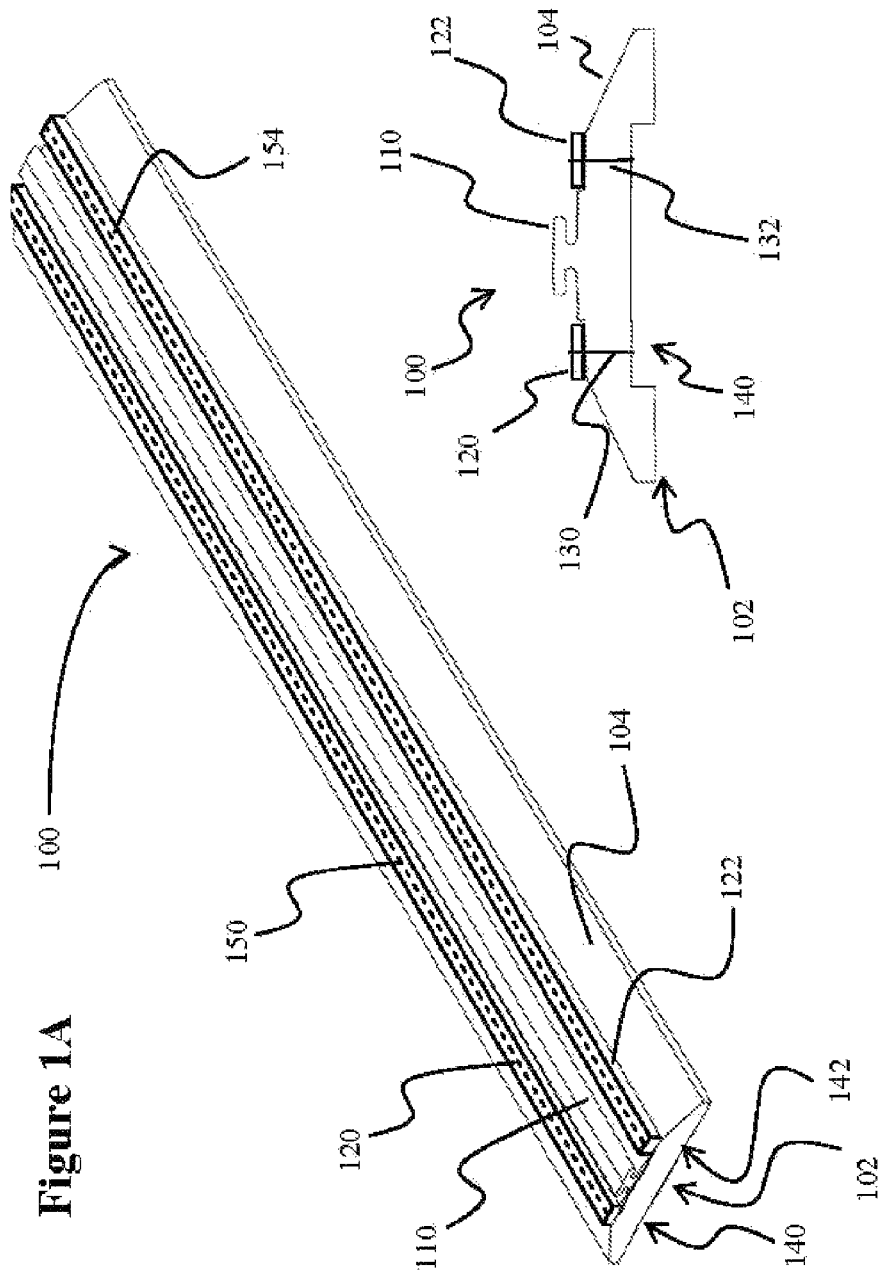

US 8,887,437 B2

ELECTRIFIED BIRD DETERRENT DEVICE WITH TREADS

This application claims the benefit of priority to U.S. provisional application having Ser. No. 61/543,253 filed on Oct. 4, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is animal deterrents, and especially as they relate to bird deterrents.

BACKGROUND

There are numerous animal deterring devices known in the art, and many of those use electric current to deter, and in some case even kill birds and other relatively small animals. For example, where a relatively large structure is to be protected, a blanket can be configured to include a plurality of vertically arranged and spaced apart electrodes as described in U.S. Pat. No. 6,925,748. While such devices may protect a relatively large area, numerous disadvantages remain. Among other things, pooling of water must be avoided at all times to allow for continuous operation. Moreover, as such devices are typically flexible, inadvertent short circuiting may occur by folding or bending a portion of the blanket.

This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Other known electrified devices include those described in U.S. Pat. No. 4,015,176 and EPO no. 1314355 in which a string-shaped carrier includes conductive traces embedded or attached to the carrier. Similarly, string-shaped structures may be formed from braided wire that further includes insulator disks as described in U.S. Pat. No. 5,031,353. While such devices are generally simple to manufacture and operate, various difficulties remain. Among other problems, such devices often fail to operate properly when moisture or rain runs along the wire, or where droppings are deposited on the wire. Similar disadvantages are observed in devices that have a rail with partially embedded conductive traces from which raised conductive tabs protrude as shown in U.S. Pat. No. 6,006,698, or in devices having a rail with two elevated conductive traces as described in U.S. pat. appl. no. 2005/0132635. Such devices are particularly sensitive to puddling or fecal contamination.

In still further known electrified deterring devices, conductive traces are mounted to an elevated carrier portion that includes spaces to allow for drainage and flexible installation as shown in U.S. Pat. Nos. 6,283,064 and 6,928,768. While such devices are often more reliable than known devices when exposed to moisture or droppings, other disadvantages arise. For example, due to the raised position of the wires, installation is frequently esthetically less pleasing than relatively flat rail-type structures. Moreover, positioning of the wires is at a fixed distance and in a manner that will allow at least some birds to perch in a position in which the bird will not receive the electrical impulse or current.

U.S. Pat. No. 7,481,021 discusses that the conductors can be sewn to the base to facilitate bending of the conductor and base. However, this is problematic because the stitches disposed on the bottom surface of the base can come into contact with water, which can seep up the thread and cause the conductors to short. While this problem can be eliminated by disposing the stitches in glue troughs that are filled with adhesive, e.g., U.S. Pat. Nos. 8,015,747 and 8,020,340, there may be situations where glue troughs are not desirable.

Thus, while there are numerous devices and methods for deterring animals, and especially birds are known in the art, all or almost all of them suffer from various disadvantages. Thus, there is still a need for new configurations and methods for bird deterrents.

SUMMARY OF THE INVENTION

The inventive subject matter provides apparatus, systems and methods for animal deterrent devices having at least one electrically conductive traces coupled to an elongated carrier. In an especially preferred embodiment, the carrier can include a first tread pattern on its bottom surface that comprises a first pattern of indented grooves. As used herein, carriers with a tread pattern on their bottom surface do not include carriers having smooth bottoms lacking any grooves as well as carriers having a bottom surface that is smooth and flat except for (a) a glue channel extending longitudinally along substantially the entire length of the surface and (b) break lines between the two sides of the carrier.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

In one aspect, the at least one conductive trace can be coupled to the carrier by a first fastener that extends from the conductive trace to at least one of the indented grooves. In this manner, each of the conductive trace and the groove(s) can have a plurality of stitches. Disposing the stitches within the indented groove(s) rather than on a bottom of the carrier that contacts a mounting surface, shorting of the conductive trace can advantageously be prevented because the groove(s) insulates the stitches from coming into contact with water that may pool at the bottom of the carrier. In this manner, water can be prevented from seeping up the fastener and contacting the conductive trace.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1A-1C are a top perspective view, a horizontal cross-sectional view, and a bottom perspective view, respectively, of one embodiment of an animal deterrent device.

DETAILED DESCRIPTION

One should appreciate that the disclosed techniques provide many advantageous technical effects including reducing the likelihood of the conductive trace from being shorted by water pooling beneath the device.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1C:
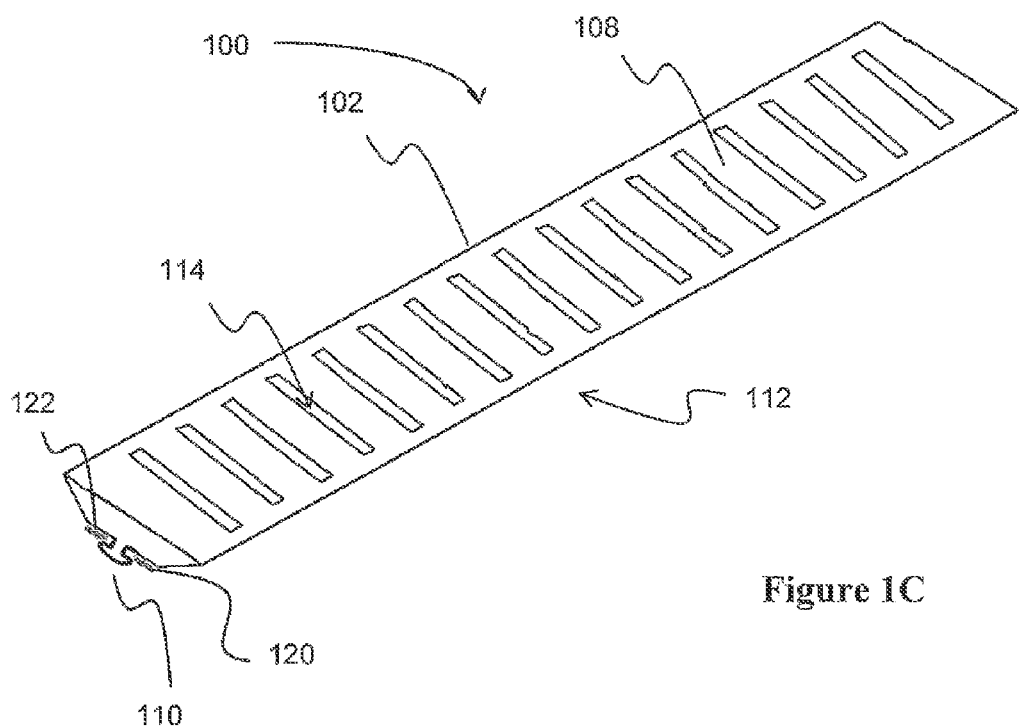

In FIGS. 1A-1C, one embodiment of an animal deterrent device 100 is shown that includes an elongated carrier 102 having first and second conductive traces 120 and 122. As shown in FIG. 1C, the carrier 102 can include a bottom 108 with a first tread pattern 112 comprising a first pattern of grooves 114. Although the first pattern 112 is shown having a series of horizontal tracks embedded into the bottom 108 of the carrier 102, it is contemplated that the first pattern 112 could include, for example, a series of intersecting grooves, a series of concentric circles, ovals, squares, and other shapes, non-concentric circles, ovals, squares, and other shapes, a series of separated indentations, crisscrossed indentations forming a waffle-shaped grid, and any other commercially suitable configuration and combination(s) thereof.

The conductive traces 120 and 122 can be coupled to the carrier 102 using any commercially suitable fastener(s) including, for example, glues and other adhesives, and metal and plastic staples, thread, and other mechanical fasteners, and any combination(s) thereof. The conductive traces can be knitted, braided or otherwise configured from a conductive material such that the traces 120 and 122 are sufficient to conduct current.

It is contemplated that the elongated carrier 102 can be manufactured from a thermoplastic elastomer or rubber-containing compound, or other commercially suitable materials or combinations thereof. For example, carrier 102 could be fabricated from numerous materials, including natural and synthetic materials, wood, glass, metals and metal alloys, and all reasonable combination thereof. Especially preferred materials include those that provide sufficient flexibility to the carrier 102 to allow the carrier 102 to conform to uneven surfaces. Most preferably, carrier 102 is soft enough to be manually deformed. It is also noted that where the carrier 102 is especially pliable, a desired form may be retained by inclusion of a more resilient element within or coupled to the carrier 102. For example, contemplated carriers may include a metal wire or other deformable element that assists the carrier to maintain a desired configuration. Furthermore, it is generally preferred that the carrier material is non-conductive. However, in alternative aspects, the carrier may also be made from, or include a conductive material. In such devices, it is then contemplated that only one conductive trace may be needed, and that such trace is typically coupled to the carrier via an insulator.

In preferred embodiments, the carrier 102 is relatively flat (i.e., has a width and length that is larger than the height) such that the device 100 can be bent, or even provided in a rolled-up configuration. The particular width and height will typically be determined by the size of bird or other animal that is to be deterred. Thus, and most commonly, the carrier 102 will be configured such that entire device has a height to width ratio between 1:5 and 1:2, and more typically between 1:4 and 1:3. For example, suitable carriers may have a width between 1 cm and 10 cm, more typically between 2 cm and 7 cm, and most typically between 3 cm and 5 cm. The length of such devices is generally determined by the desired overall length of the device or device segment and may therefore vary between several cm and several meters and even longer. The height of contemplated devices will generally be between 1 mm and 3 cm, and more typically between 3 mm and 1 cm. Further contemplated carriers may include one or more cutouts (not shown) sized and configured to allow for side-to-side flexing of the carrier 102. For example, such cutouts may be formed to allow positioning the carrier in a 90 degree angle with a radius of less than 20 cm, more preferably less than 15 cm, and most preferably less than 10 cm.

In preferred embodiments, each of the conductive traces 120 and 122 can be coupled to carrier 102 by threads 130 and 132, respectively. The traces 120 and 122 may be coupled to the carrier 102 on a horizontal surface or an angled surface 106, and are preferably at least partially disposed over the cavity 140. As shown in FIG. 1B, the first trace 120 can be coupled to the carrier 102 by a thread 130 that extends from the first trace 120 to the groove 114, such that each of the first trace 120 and the groove 114 has a plurality of stitches 150. In a similar fashion, the second trace 122 can be coupled to the carrier 102 by a second thread 132 that extends from the second trace 122 to the groove 114, such that each of the first trace 120 and the groove 114 has a plurality of stitches 152. Sewing traces 120 and 122 to the carrier 102 advantageously allows the traces 120 and 122 to flex as the carrier 102 flexes. It is contemplated that one or both of threads 130 and 132 may extend through only a portion of conductive traces 120 and 122, respectively, or alternatively extend from a first end to a second end of conductive traces 120 and 122. It is further contemplated that one or both of threads 130 and 132 may extend only to an edge (e.g., roof) of cavity 140 rather than extend into the cavity 140.

Furthermore, sewing the traces 120 and 122 to the groove 114 rather than a bottom surface 108 of the carrier 102 advantageously insulates the stitches 150 and 152 from coming into contact with water that could pool at the bottom surface 108. In this manner, the water is prevented from seeping up the threads 130 and 132 and shorting traces 120 and 122.

The first and second conductive traces 120 and 122 are typically spaced apart at a distance that allows formation of an electric circuit when a foot of a bird (e.g., an adult pigeon, an adult seagull) rests on the device. Therefore, and depending on the particular bird, suitable distances between first and second traces 120 and 122 will be between 5 mm and 2 cm, and more typically between 7 mm and 1.5 cm. In still further preferred aspects, the first and second conductive traces 120 and 122 are parallel to an arc suppressor 110, and/or at least one of the first and second conductive traces 120 and 122 are continuous along substantially (+/−5%) the entire length of the carrier 102. Where desirable, at one part of the carrier 102 is angled to a degree such that when the device is installed on a horizontal surface, water runs off the angled part. Depending on the particular configuration, the angled part may include the portion to which the trace is coupled, and/or a portion between a conductive trace and the arc suppressor 110 or the outer edge of the carrier 102.

The carrier 102 can further include an arc suppressor 110 that separates the traces 120 and 122 from one another. It is generally preferred that the arc suppressor 110 has an umbrelloid shape and is continuous along the length of the carrier. While there are numerous alternative configurations are contemplated for the arc suppressor 110, it is generally preferred that the arc suppressor increases the creep distance between the conductive traces 120 and 122 at least 1.5 times, more typically at least 1.7 times, even more typically at least 2.0 times, and most typically at least 2.2 times, thereby preventing all or almost all circumstances where moisture, dew, or rain may cause short-circuiting.

As used herein, the term "creep distance" refers to a distance that is measured between two points on a body when following the shortest path between those points along the surface of that body. As also used herein, the term "umbrelloid shape" refers to any shape of an element that is coupled to the device where that element has a downward facing surface portion when the device is installed on a horizontal surface. Most typically, the downward facing portion is contiguous with an upward facing portion, and the element will therefore have a sharp angled or rounded edge from which water or other fluids can drip off. Viewed from a different perspective, elements with umbrelloid shape will generally have a downward facing portion and an upward facing portion that are either substantially parallel (+/−15 degrees), or form an angle between 15 and less than 90 degrees. Exemplary umbrelloid shapes include a T-shape, a stemmed inverted U-shape, and a stemmed inverted V-shape.

In especially preferred aspects, the arc suppressor 110 has an umbrelloid shape and a height to width ratio between 1:10 and 1:1, and more typically between 1:6 and 1:1. For example, contemplated arc suppressors generally include stemmed structures in which a first generally vertical element carries a horizontal or curved element to form a T-shape, a stemmed inverted V-shape, a stemmed inverted U-shape, or an otherwise stemmed structure that has at least one generally horizontally extending protrusion. Depending on the particular shape, it should be appreciated that a vertical gap will be formed between at least part of the arc suppressor and the portion of the carrier to which the traces are coupled, and that such gap will assist in breaking a layer of conductive material that extends across the device.

It should be noted that the shape of the arc suppressor 110 can generate a space that is protected from contact with conductive material falling vertically (and even from falling at an angle of up to 45 degrees, and more) onto the device. Still further, it should be noted that the shape of the arc suppressor 110 can also provide for a vertical clearance (i.e., empty space between the shortest vertical distance between at least one of the conductive traces and the top surface of the device or the arc suppressor) that is effective in disrupting a conductive film, flow, and/or layer between the traces.

Figure 2:
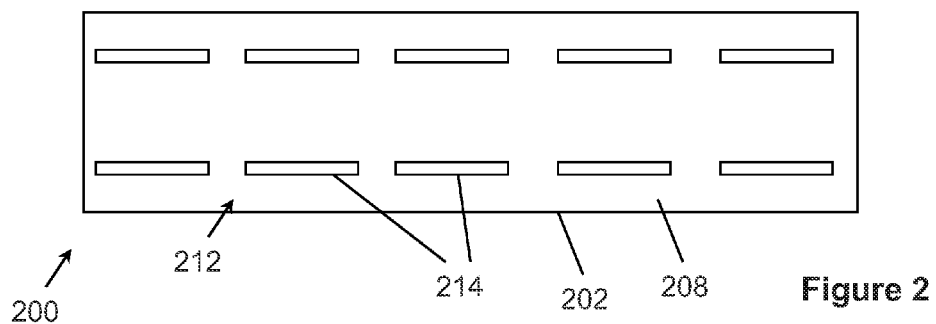
FIGS. 2-7 are bottom views of various embodiments of animal deterrent devices. A clean and marked up version of the specification is also submitted herewith.

FIG. 2 illustrates an alternative embodiment of an animal deterrent device 200, where a bottom surface 208 of the device 200 has a pattern 212 of disconnected grooves 214. Where a conductive trace is sewn to the carrier 202, it is contemplated that the thread or other fastener(s) can extend from the conductive trace to one or more of grooves 214, such that each of the conductive trace and groove(s) has one or more stitches. It is further contemplated that the thread or other fastener(s) may extend through only a portion of the conductive trace, or alternatively may extend from a first end to a second end of the conductive trace. In addition, it is contemplated that the thread or other fastener(s) may extend only to an edge (e.g., roof) of the groove 214 rather than extend into the groove 214.

By disposing the stitches within the groove(s) 214 rather than the carrier's bottom surface 208, the stitches are advantageously raised from the bottom surface 208 to thereby reduce the likelihood of water contacting the stitches, wicking up the thread or other fastener(s), and shorting a conductive trace.

It is further contemplated that one or more of grooves 214 can be used as troughs for glue or other adhesive to thereby adhere the carrier 202 to a surface. Furthermore, by disposing the glue or other adhesive within one or more of the grooves 214, an adhesive barrier can be formed that covers stitches within the groove(s) 214 to insulate the stitches and prevent the likelihood of water contacting stitches. With respect to the remaining numerals in FIG. 2, the same considerations for like components with like numerals of FIG. 1C apply.

Figure 3:
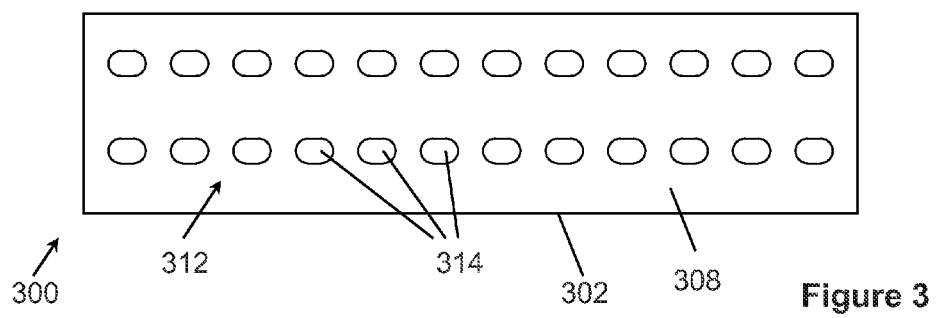
Figure 4:
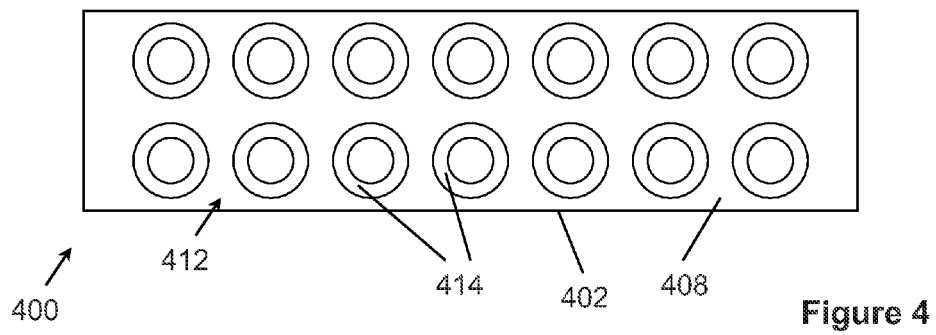

FIGS. 3-4 illustrate alternative embodiments of animal deterrent devices 300 and 400, which each has a different pattern of disconnected grooves 312 and 412, respectively. With respect to the numerals in each of FIGS. 3-4, the same considerations for like components with like numerals of FIG. 1C apply.

Although the devices in FIGS. 2-4 have disconnected grooves, it is contemplated that some or all of the grooves could be connected with one or more neighboring grooves.

Figure 5:
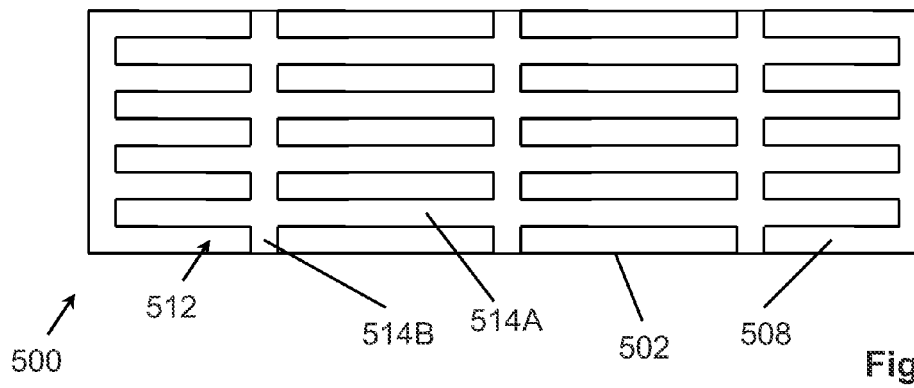

FIG. 5 illustrates yet another embodiment of an animal deterrent device 500. A bottom surface 508 of device 500 can include a pattern 512 of grooves composed of intersecting grooves 514A and 514B. Advantageously, groove 514B can extend from side to side of the carrier 502 to along its bottom surface 508, to reduce a thickness of the carrier 502 at the location of the groove 514B. Such reduction in thickness facilitates bending of the carrier 502 as needed to align the carrier 502 to a mounting surface.

Figure 6:
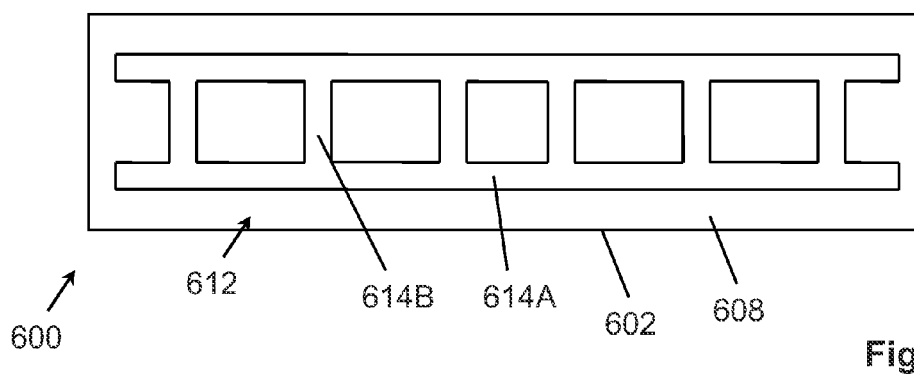
Figure 7:
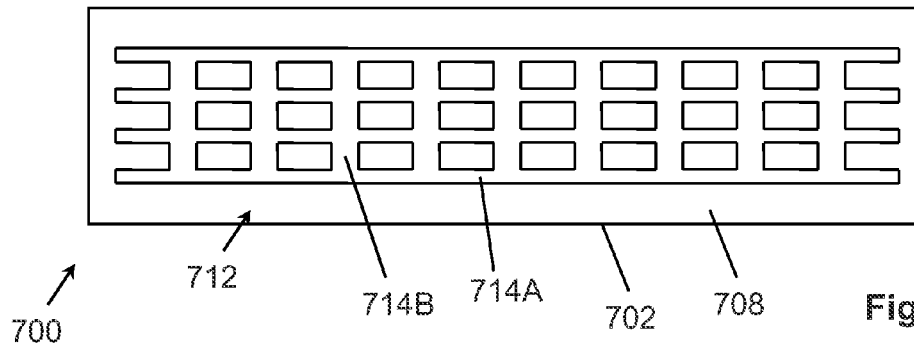

FIGS. 6-7 illustrate alternative embodiments of animal deterrent devices 600 and 700, which each has a different pattern of disconnected grooves 612 and 712, respectively. With respect to the numerals in each of FIGS. 6-7, the same considerations for like components with like numerals of FIG. 1C apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An animal deterrent device comprising:
   an elongated carrier having a first conductive trace; and
   wherein the carrier has a bottom with a first tread pattern comprising a first pattern of grooves, wherein the first pattern of grooves comprises intersecting grooves that extend horizontally across a width of the carrier.

2. The device of claim 1, wherein the first pattern of grooves comprises a series of indentations.

3. The device of claim 1, wherein the first pattern of grooves comprises crisscrossed indentations forming a waffle-shaped grid.

4. The device of claim 3, wherein at least one of the indentations extends from a first side to a second side of the carrier.

5. The device of claim 1, wherein the first pattern of grooves comprises at least one of circles, ovals, squares, triangles, and rectangles.

6. The device of claim 1, wherein the first pattern of grooves comprises a series of disconnected grooves.

7. The device of claim 1, wherein the first conductive trace is sewn to the carrier.

8. The device of claim 1, wherein the first conductive trace is coupled to the carrier by a first fastener that extends from the first conductive trace to the first pattern of grooves.

9. The device of claim 8, wherein the bottom further comprises:
- a second tread pattern comprising a second pattern of grooves; and
- wherein the first fastener further extends from the first conductive trace to the second pattern of grooves.

10. The device of claim 1, wherein the carrier further comprises a second conductive trace.

11. The device of claim 10, wherein the carrier has an elevated arc suppressor disposed between the first and second conductive traces.

12. The device of claim 10, wherein the first and second conductive traces are sewn to the carrier.

13. The device of claim 12, wherein the first conductive trace is coupled to the carrier by a first fastener that extends from the first conductive trace to the first pattern of grooves.

14. The device of claim 12, wherein the bottom further comprises:
- a second tread pattern comprising a second pattern of grooves; and
- wherein the second fastener further extends from the second conductive trace to the second pattern of grooves.

15. The device of claim 1, wherein the first conductive trace comprises a braided wire.

16. The device of claim 1, wherein the first conductive trace comprises a knitted wire.

17. The device of claim 1, wherein the grooves extend across only a portion of a width of the elongated carrier.

18. An animal deterrent device comprising:
- an elongated carrier having a first conductive trace; and
- wherein the carrier has a bottom with a first tread pattern comprising a first pattern of grooves, wherein the first pattern of grooves comprises a plurality of grooves that each extends along only a portion of a width of the elongated carrier.

\* \* \* \* \*